United States Patent [19]

Skypala

[11] 4,372,510
[45] Feb. 8, 1983

[54] WIRE RACEWAY FOR ATTACHMENT UNDER THE FLOOR OF A RAILWAY CAR

[75] Inventor: Louis M. Skypala, Oreland, Pa.

[73] Assignee: The Budd Company, Troy, Mich.

[21] Appl. No.: 175,333

[22] Filed: Aug. 4, 1980

[51] Int. Cl.³ .............................................. E21F 17/02
[52] U.S. Cl. ........................................ 248/58; 248/49;
248/68 R
[58] Field of Search ...................... 248/49, 58, 59, 62,
248/68 R, 68 CB

[56] References Cited
U.S. PATENT DOCUMENTS
1,939,538 12/1933 Buhr ................................ 248/58 X

FOREIGN PATENT DOCUMENTS

| 76093 | 7/1953 | Denmark | 248/49 |
| 2353471 | 11/1974 | Fed. Rep. of Germany | 248/49 |
| 1457364 | 9/1966 | France | 248/49 |
| 136691 | 12/1919 | United Kingdom | 248/58 |

Primary Examiner—J. Franklin Foss
Attorney, Agent, or Firm—A. L. Trueax, Jr.

[57] ABSTRACT

A wire raceway for attachment under the floor of a railway car includes a plurality of spaced hangers connected to the floor and disposed to receive wires or cables thereon. A cover including a plurality of sections extending along the raceway is adapted to cover and protect the wires after installation. Joint butt supporting straps are connected at the ends of the sections of the cover to hold the sections in place against the hangers.

8 Claims, 4 Drawing Figures

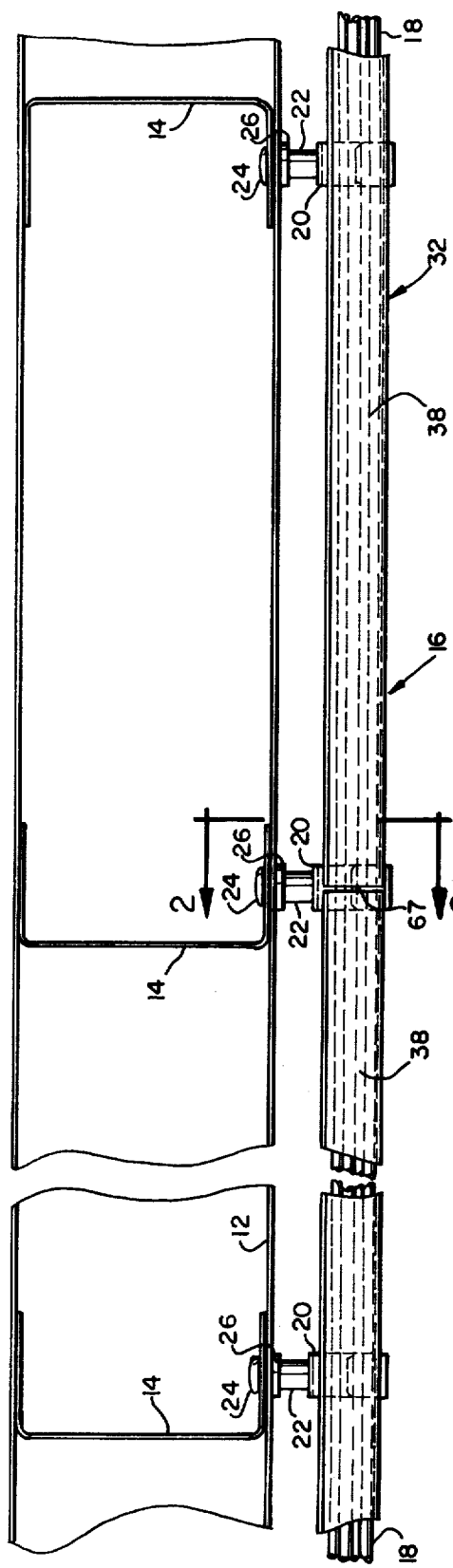
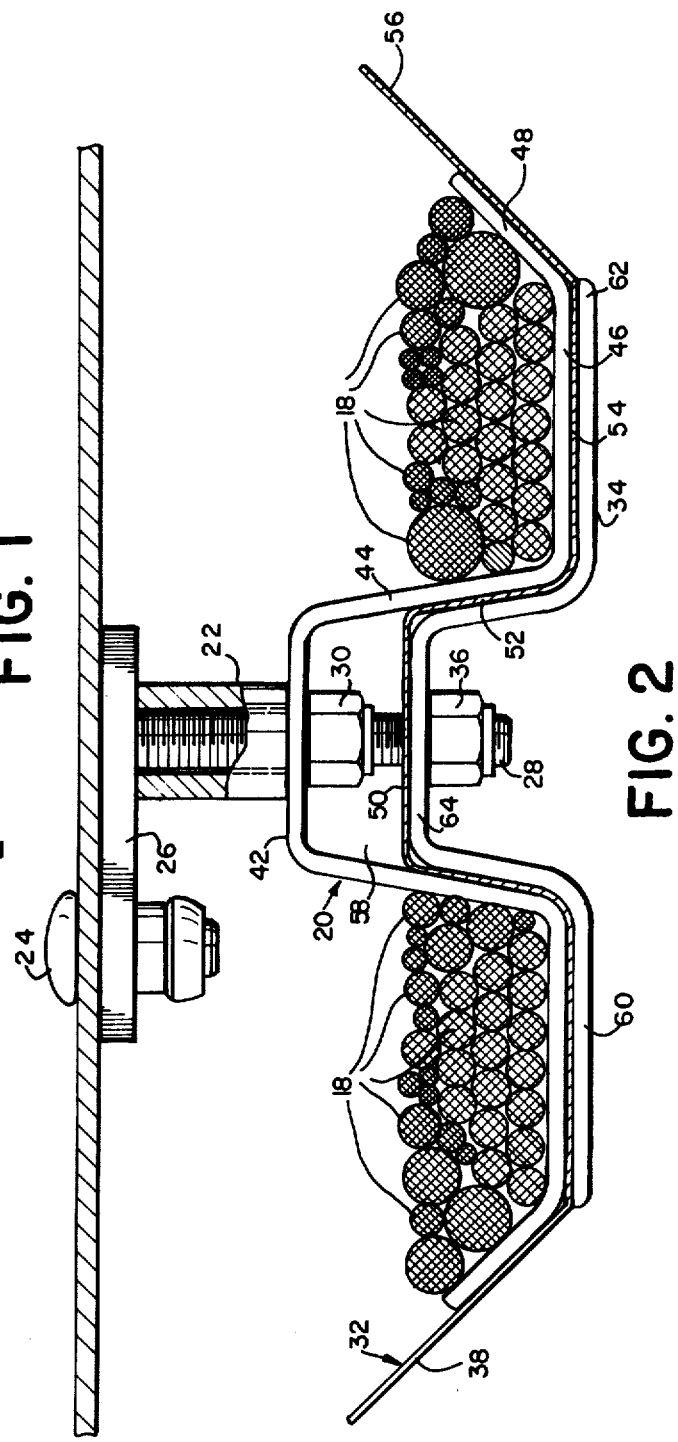

WIRE RACEWAY FOR ATTACHMENT UNDER THE FLOOR OF A RAILWAY CAR

BACKGROUND OF THE INVENTION

Electrical wires and cables are used extensively under the floors of railway cars. Modern rail systems have led to a large increase in such wires to accommodate air conditioning systems, increased communications equipment and the like.

Generally such wires or cables are placed in conduits which are secured to the underside of the car. If such wires were placed on hangers connected to the floor, they would be unsupported between the hangers and would tend to drop down due to the weight of the wires. Because of the weight of the wires and the fact that they are exposed to the weather, the tendency for the insulation on the wires to wear and cause short circuits is greatly enhanced. Also, exposed or hanging wires may be accidentally subjected to damage by workmen. In addition, when cars are travelling at high speeds, exposed cables may be struck and damaged by loose stones, tie plates or other flying objects.

Sagging wires under the car not only may cause mechanical or electrical problems, but also detract from the overall appearance of the car.

It is known that many electrical wires in railway cars carry high currents. When these wires are bunched with other wires or if subjected to water, their resistance and other electrical characteristics may change. Consequently, it is desirable to provide ventilation for the wires below the floor of a railway car. Of course, electrical systems involving holding clips, clamps and protective covers have been used extensively in fields outside of the railway field. Such other fields generally do not present the same problems found in railway cars which travel at high speeds and include a large number of wires which must be protected.

It is an object of this invention to provide an improved wire raceway for holding wires under the floor of a railway car.

It is a further object of this invention to provide a wire raceway under the floor of a railway car having improved means for supporting and protecting the wires.

It is still a further object of this invention to provide an improved raceway for wires under the floor of a raceway car with means to ventilate the wires.

It is still a further object of this invention to provide a wire raceway under the floor of a railway car having improved protective means for preventing water from accumulating around the wires which may lead to deterioration of the insulation and circuit failures in the wires.

BRIEF SUMMARY OF THE INVENTION

A wire raceway for holding wires or cables extending longitudinally under the floor of a railway car includes a plurality of spaced hangers. A cover extends longitudinally and is connected to the hangers to prevent sagging of the wires and to protect them from the weather and mechanical damage. The cover is perforated to permit ventilation around the wires and to prevent the accumulation of water.

Other objects and advantages of the present invention will be apparent and suggest themselves to those skilled in the art from a reading of the following specification and claims, taken in conjunction with the accompanying drawings, in which:

FIG. 1 is a side view of a wire raceway disposed under the floor of a railway car, in accordance with the present invention;

FIG. 2 is a cross-sectional view taken along lines 2—2 of FIG. 1;

DESCRIPTION OF THE PRESENT INVENTION

Figure 3:
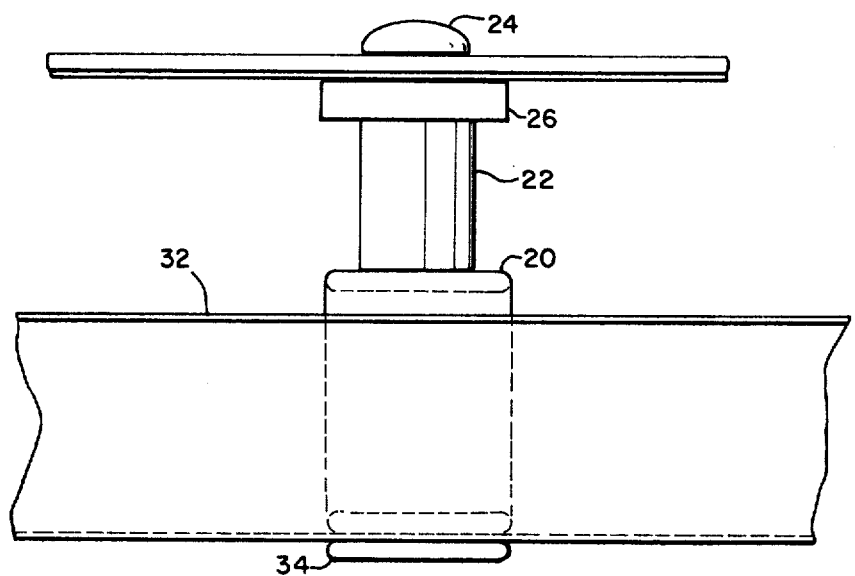
FIG. 3 is an enlarged local view of a portion of FIG. 1.

Referring to FIG. 1, a railway car includes a conventional floor 12 secured to lateral beams 14. A wire raceway 16 extends longitudinally under the floor 12. A plurality of wires or cables 18 are carried by the wire raceway 16.

A plurality of hanger members 20 are connected to the floor 12 through spacer elements 22 by means of rivet means 24 and plates 26. The spacer elements 22 include central openings to receive threaded studs 28. The studs 28 are welded or otherwise secured to plates 26. The hanger members are secured in place by means of nuts 30 threaded on the studs 28.

As illustrated in FIG. 2, after the hanger members 20 are secured in place by the nuts 30 and the wires 18 have been installed, the cover 32 is inserted over the studs 28. The cover 32 includes a plurality of sections 38. The sections may be of various lengths and may be longer than the distances between the hanger members. However, the ends of the adjoining sections must be at a hanger member and the end joints thereof supported. The cover is held in place by joint supporting strapes 34 which include openings therein adapted to fit over the studs 28 and held in place by nuts 36.

Figure 4:
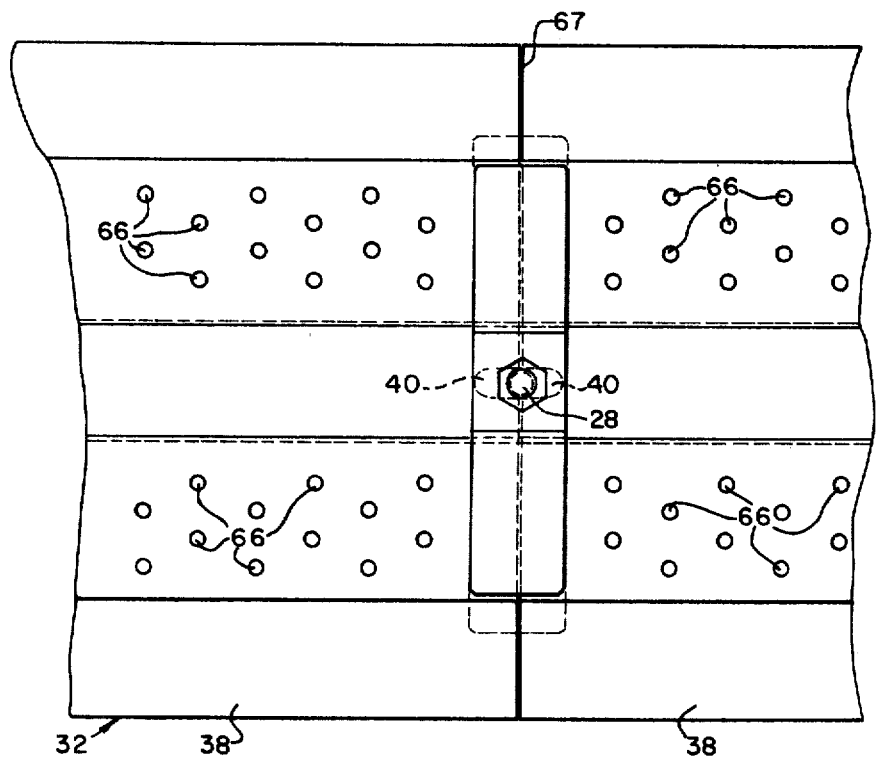
FIG. 4 is a view looking upwardly at a portion of the wire raceway illustrated in FIG. 1.

As illustrated in FIG. 4, the ends of the sections 38 include slot openings 40 to receive the studs 28 therethrough. The slots 40 are slightly elongated to accommodate any misalignment and manufacturing tolerances involved in rail car construction.

As illustrated in FIG. 2, the hanger member 20 includes a center connection portion 42 having lateral portions extending oppositely therefrom to provide the structure for holding the cables 18. Each of the laterally extending sections include similar type of structure and therefore only the right side as illustrated in FIG. 2 will be described. An inner section 44 having an opening to receive the stud 28 extends downwardly and outwardly at an angle from the center connection portion 42 to a central section 46. The central section 46 extends outwardly from the section 44 and is generally parallel to the floor 12. An outer section 48 extends from the central section 46 outwardly and upwardly at an angle. Both sides of the laterally extending sections are substantially the same shape and designed to hold the cables 18 with the main weight of the cables resting on the central sections 46.

Each of the sections 38 of the cover 32 are shaped somewhat similar to the shape of the hanger members 20. The section 38 includes a center connection portion 50 having an opening to receive the stud 28. Similar types of lateral extensions extend from both sides of the center connection portion 50 and only the one to the right illustrated in FIG. 2 will be described. The section 38 includes an inner downwardly angularly extending portion 52 extending from portion 50 to a central portion 54 which is parallel to the floor 12. An outer portion 56 extends outwardly and upwardly at an angle from the central portion 54.

The sections of the cover are shaped to fit into and over the hanger members. The portions 52 of the cover 32 are shorter than the sections 44 in the hanger members 20. Thus when the two parts are joined as illustrated, a space or area 58 is provided. This space provides room for the mounting means including the nuts 30. The joint butt supporting strips 34 are shaped to conform to the angles of the cover 32 and includes an outer section 60, inner section 62 and center connection section 64 which includes an opening for the stud 28. All of the sections of the cover 32, the hanger members 20 and joint butt supporting straps 34 may be said to have central recesses therein. Among other things, the recesses make it possible to keep the ends of the studs 28 above the cover where they will not provide obstacles.

As illustrated in FIG. 4, the sections 38 of the cover include a plurality of perforations 66. These perforations are in the portion 54 of the cover below the cables. The perforations assure that any water which tends to accumulate around the cables is free to drop through the cover. A gap 67 is illustrated between the ends of the sections 38 to show the allowance for normal manufacturing tolerances in such parts.

When the wires or cables are installed, they are first hung over the hanger members 20. The cables are generally installed at different times during the manufacture of the railway car. Consequently, it is important that the hangers be left open and available for additional wires. After all the wires have been installed, however, it is desirable to provide additional support and protection for the wires which may tend to sag between the hangers. This is accomplished by the cover described which is installed after all of the wires are in place.

The sizes of the wires may vary. One embodiment may involve extensions from both sides of the hanger members between two or three inches. Such hanger members may, for example, accommodate about four square inches of wire. Of course, the sizes of the hangers and covers may be made larger dependent upon the particular design requirements.

What is claimed is:

1. A wire raceway for holding wires extending under the floor of a railway car comprising:
   (a) a plurality of threaded studs secured to said floor and extending downward therefrom, a spacer member positioned about said threaded stud adjacent said floor and a spaced hanger member positioned on each of said studs below said spacer and comprising a flat center connecting section about said stud, opposite laterally extending sections extending from said center connecting section for supporting wires to be placed thereon in the space between said hanger member and floor, and a nut threadably engaging the threads of said stud and engaging said center section for securing said center section against said spacer member,
   (b) a cover below said nut and including a plurality of extending sections extending between said spaced hanger members, and
   (c) strap elements disposed to be connected to said threaded stud at the ends of said sections of said cover to support said sections against said hanger members.

2. A wire raceway as set forth in claim 1 wherein said sections of said cover include a plurality of perforations therein to prevent water from accumulating around said wires and providing ventilation.

3. A raceway as set forth in claim 2 wherein said laterally extending sections of said hanger members each include an inner section extending outwardly and downwardly at an angle from said flat center connection section, a central support section substantially parallel with said floor and an outer section extending outwardly and upwardly at an angle.

4. A raceway as set forth in claim 3 wherein said sections of said cover include longitudinally extending inner, central and outer portions extending from a flat center connection portion corresponding to the angles of the laterally extending sections of said hanger members.

5. A wire raceway as set forth in claim 4 wherein the inner angular portions of said sections of said cover are shorter than the inner angular portions of said hanger member so that mounting space is provided between said flat center connection section of said hanger member and said flat center connection portion of said section of said cover.

6. A wire raceway as set forth in claim 5 wherein each of said hanger members includes an opening therein, and studs are secured to said floor and extend through openings of said hanger members and said space members, and nuts are provided to threadedly engage said studs to secure said hanger members in place against said spacer members.

7. A wire raceway as set forth in claim 6 wherein slots are provided in the ends of said sections of said cover to receive said threaded studs, said slots being sufficiently large to accommodate slight misalignments in the sections of said cover when they are installed.

8. A wire raceway for holding wires extending under the floor of a railway car comprising:
   (a) a plurality of threaded studs secured to said floor and extending downwardly therefrom;
   (b) a spaced hanger member positioned about each of said studs and including opposite laterally extending sections extending from a flat center connecting section and being connected to and extending below said floor and having each spacer member about said threaded stud to provide space between said floor and said hanger member to permit wires to be placed on said hanger member in the space between said hanger members and floor and a first nut threadably engaging said threaded stud to secure said hanger member against said spacer member and in position on said stud;
   (c) each of said laterally extending sections of said hanger members include an inner section extending outwardly and downwardly at an angle from said flat center connection section, a central support section substantially parallel with said floor and an outer section extending outwardly and upwardly at an angle;
   (d) a cover including a plurality of extending sections extending between said spaced hanger members including a plurality of perforations for preventing water and debris accumulation therein;
   (e) each of said sections of said cover include longitudinally extending inner, central and outer portions extending from a flat center connection portion corresponding to the angles of the laterally extending sections of said hanger members, and each end of said inner portion having a slot therein for accommodating misalignments of the sections during assembly;

(f) said inner angular portions of said sections of said cover are shorter than the inner angular portions of said hanger member so that mounting space is provided between said flat center connection section of said hanger member and said flat center connection portion of said section of said cover; and (g) strap elements disposed to be connected to said hanger members by a second nut threadably engaging said stud and at the ends of said sections of said cover to support said sections against said hanger members.

* * * * *